(12) United States Patent
Hofmann et al.

(10) Patent No.: US 7,799,713 B2
(45) Date of Patent: Sep. 21, 2010

(54) COMPOSITION FOR HIGH PERFORMANCE GLASS, HIGH PERFORMANCE GLASS FIBERS AND ARTICLES THEREFROM

(75) Inventors: Douglas A. Hofmann, Hebron, OH (US); Peter B. McGinnis, Gahanna, OH (US)

(73) Assignee: OCV Intellectual Capital, LLCDE (US)

( * ) Notice: Subject to any disclaimer, the term of this patent is extended or adjusted under 35 U.S.C. 154(b) by 895 days.

(21) Appl. No.: 11/267,739

(22) Filed: Nov. 4, 2005

(65) Prior Publication Data

US 2008/0009403 A1    Jan. 10, 2008

(51) Int. Cl.
C03C 13/06    (2006.01)
C03C 3/085    (2006.01)

(52) U.S. Cl. .................. 501/36; 501/35; 501/69; 416/230; 416/223

(58) Field of Classification Search .................. 501/35, 501/36, 69; 416/230, 223
See application file for complete search history.

(56) References Cited

U.S. PATENT DOCUMENTS

| | | | |
|---|---|---|---|
| 3,189,471 A | 6/1965 | Thomas | |
| 3,402,055 A | 9/1968 | Harris et al. | |
| 3,484,259 A | 12/1969 | Lewis et al. | |
| 3,524,738 A | 8/1970 | Grubb et al. | |
| 3,535,096 A | 10/1970 | Bour et al. | |
| 3,804,646 A | 4/1974 | Dumbaugh, Jr. | |
| 3,861,926 A | 1/1975 | Irlam et al. | |
| 3,887,386 A | 6/1975 | Majumdar | |
| 3,892,581 A | 7/1975 | Burgman et al. | |
| 3,904,423 A | 9/1975 | Guthrie | |
| 3,945,838 A | 3/1976 | Erickson et al. | |
| 4,063,001 A | 12/1977 | Zlochower | |
| 4,199,364 A * | 4/1980 | Neely | 501/35 |
| 4,325,724 A * | 4/1982 | Froberg | 65/474 |
| 4,366,251 A | 12/1982 | Rapp | |
| 4,375,527 A | 3/1983 | Zahner | |
| 4,491,951 A | 1/1985 | Dunn | |
| 4,582,748 A | 4/1986 | Eastes | |
| 4,764,487 A | 8/1988 | Lewis | |
| 4,857,485 A | 8/1989 | Brennan et al. | |
| 4,892,846 A | 1/1990 | Rogers et al. | |
| 4,935,291 A | 6/1990 | Gunnink | |
| 4,976,587 A * | 12/1990 | Johnston et al. | 416/230 |
| 5,302,444 A | 4/1994 | Jackson et al. | |
| 5,332,699 A | 7/1994 | Olds et al. | |
| 5,474,425 A * | 12/1995 | Lawlor | 416/223 R |
| 5,569,629 A | 10/1996 | TenEyck et al. | |
| 5,576,252 A | 11/1996 | Rapp et al. | |
| 5,585,312 A | 12/1996 | TenEyck et al. | |
| 5,789,329 A | 8/1998 | Eastes et al. | |
| 5,851,932 A | 12/1998 | Dickson et al. | |
| 5,935,886 A | 8/1999 | Jensen et al. | |
| 5,948,535 A | 9/1999 | Chiurlo et al. | |
| 5,962,354 A * | 10/1999 | Fyles et al. | 501/36 |
| 5,997,977 A | 12/1999 | Zou et al. | |
| 6,063,470 A | 5/2000 | Zou et al. | |
| 6,101,847 A | 8/2000 | Shamp | |
| 6,136,735 A | 10/2000 | Gallo et al. | |
| 6,214,429 B1 | 4/2001 | Zou et al. | |
| 6,237,369 B1 | 5/2001 | LeBlanc et al. | |
| 6,248,678 B1 | 6/2001 | Pinckney | |
| 6,306,786 B1 | 10/2001 | Koyama et al. | |
| 6,314,760 B1 | 11/2001 | Chenoweth | |
| 6,329,310 B1 | 12/2001 | Peuchert et al. | |
| 6,376,403 B1 | 4/2002 | Koyama et al. | |
| 6,399,527 B1 | 6/2002 | Kishimoto et al. | |
| 6,457,943 B1 * | 10/2002 | Olsen et al. | 416/230 |
| 6,540,508 B1 | 4/2003 | Simpson et al. | |
| 6,579,599 B1 | 6/2003 | Blum et al. | |
| 6,686,304 B1 * | 2/2004 | Wallenberger | 501/35 |
| 6,809,050 B1 * | 10/2004 | McGinnis | 501/35 |
| 6,933,045 B2 | 8/2005 | Tamura | |
| 6,933,252 B2 | 8/2005 | Pierce | |
| 6,998,361 B2 | 2/2006 | Lewis | |
| 7,259,118 B2 | 8/2007 | Jubb et al. | |
| 7,285,510 B2 | 10/2007 | Sakaguchi et al. | |

(Continued)

FOREIGN PATENT DOCUMENTS

| | | |
|---|---|---|
| GB | 428 720 A | 5/1935 |
| JP | 58 064243 A | 4/1983 |
| WO | WO 2004/094794 | 11/2004 |
| WO | WO 2007/055964 | 5/2007 |
| WO | WO 2007/055968 | 5/2007 |

OTHER PUBLICATIONS

Thomson Scientific, London, GB; AN 1983-50368K Database WPI Week 198321.

(Continued)

Primary Examiner—Karl E Group
Assistant Examiner—Elizabeth A Bolden
(74) Attorney, Agent, or Firm—James J. Dottavio; Joan N. Drew

(57) ABSTRACT

Glass batch compositions for the formation of high-modulus, and high-strength glass fibers as well as fibers suitable for use as textile and reinforcements are disclosed. Fibers formed of the composition are especially suitable for use in high-strength, low-weight applications such as windmill blades and high strength and modulus applications where strength and stiffness are required in the composite. The glass composition is up to about 70.5 weight % $SiO_2$, about 24.5 weight % $Al_2O_3$, about 22 weight % alkaline earth oxides and may include small amounts of alkali metal oxides and $ZrO_2$. Fiberglass-reinforced composite articles such as windmill blades are also disclosed.

16 Claims, No Drawings

U.S. PATENT DOCUMENTS

| | | | |
|---|---|---|---|
| 7,449,419 B2 * | 11/2008 | Li | 501/36 |
| 2002/0000101 A1 | 1/2002 | Chenoweth | |
| 2002/0045528 A1 | 4/2002 | Kusuno et al. | |
| 2003/0077178 A1 | 4/2003 | Stearns | |
| 2003/0100431 A1 | 5/2003 | Koyo et al. | |
| 2003/0166446 A1 | 9/2003 | Lewis | |
| 2003/0188554 A1 | 10/2003 | Baker et al. | |
| 2003/0207748 A1 | 11/2003 | Wallenberger | |
| 2003/0224922 A1 * | 12/2003 | Wallenberger | 501/35 |
| 2004/0092379 A1 | 5/2004 | Lewis | |
| 2005/0014624 A1 | 1/2005 | Jubb et al. | |
| 2005/0031703 A1 | 2/2005 | Beier et al. | |
| 2005/0084440 A1 | 4/2005 | Chacon et al. | |
| 2005/0085369 A1 | 4/2005 | Jensen | |
| 2005/0090377 A1 | 4/2005 | Shelestak et al. | |
| 2005/0130825 A1 | 6/2005 | Kravchenko et al. | |
| 2005/0232828 A1 | 10/2005 | Merry | |
| 2005/0234216 A1 | 10/2005 | Klein et al. | |
| 2006/0001005 A1 | 1/2006 | Kishimoto et al. | |
| 2006/0003884 A1 | 1/2006 | Nishizawa et al. | |
| 2006/0257240 A1 * | 11/2006 | Naskali et al. | 415/4.4 |
| 2007/0105701 A1 | 5/2007 | Hoffmann et al. | |
| 2007/0107220 A1 * | 5/2007 | Bakhuis et al. | 29/889.7 |
| 2008/0009403 A1 | 1/2008 | Hofmann et al. | |
| 2008/0053152 A1 | 3/2008 | Kurachi et al. | |

OTHER PUBLICATIONS

International Search Report PCT/US06/42437 dated Mar. 4, 2007.
European Search Report EP 06 82 7125 dated Dec. 10, 2008.
Conference paper by G. Fredell, "Fiber metal laminates for improved structural integrity," 1992.
Article by P. Joosee, "Literature search of mechanical properties of fiber-reinforced plastics for wind turbine rotors," Dec. 1988.
International Search Report PCT/US06/42406 dated Mar. 4, 2007.
PCT Notification of Transmittal of the International Search Report and the Written Opinion of the International Searching Authority, or the Declaration, Application PCT/US06/42437 dated Apr. 30, 2007.
PCT Notification Concerning Transmittal of Copy of International Preliminary Report on Patentability, Application PCT/US06/042406 dated May 15, 2008.
PCT Notification of Transmittal of the International Search Report and the Written Opinion of the International Searching Authority, or the Declaration, Application PCT/US06/42406 dated May 8, 2007.
US Office Action, U.S. Appl. No. 11/267,702 dated Dec. 23, 2008.
US Office Action, U.S. Appl. No. 11/267,702 dated Sep. 24, 2008.
European Search Report, EP 06 82 7125 dated Dec. 10, 2008.

* cited by examiner

COMPOSITION FOR HIGH PERFORMANCE GLASS, HIGH PERFORMANCE GLASS FIBERS AND ARTICLES THEREFROM

TECHNICAL FIELD AND INDUSTRIAL APPLICABILITY OF THE INVENTION

The present invention is generally directed to a composition for continuous glass fibers for use in high-strength applications as well as high-strength glass fibers and articles.

BACKGROUND OF THE INVENTION

The most common glass composition for making continuous glass fiber strands is "E-Glass." The liquidus temperature of E-Glass is approximately 2100° F. (1149° C.) or lower. One advantage of E-Glass is that its liquidus temperature allows operating temperatures for producing glass fibers to be approximately 1900° F. to 2400° F. (1038° C. to 1316° C.). The ASTM classification for E-glass fiber yarns used in printed circuit boards and aerospace applications defines the composition to be 52 to 56 weight % $SiO_2$, 16 to 25 weight % CaO, 12 to 16 weight % $Al_2O_3$, 5 to 10 weight % $B_2O_3$, 0 to 5 weight % MgO, 0 to 2 weight % $Na_2O$ and $K_2O$, 0 to 0.8 weight % $TiO_2$, 0.05 to 0.4 weight % $Fe_2O_3$ and 0 to 1.0 weight % Fluorine.

Boron-free fibers are sold under the trademark ADVANTEX (Owens Corning, Toledo, Ohio, USA). Boron-Free fibers, such as are disclosed in U.S. Pat. No. 5,789,329, incorporated herein by reference in its entirety, offer a significant improvement in operating temperatures over boron-containing E-glass. Boron-Free glass fibers fall under the ASTM definition for E-glass fibers for use in general-use applications.

S-Glass is a family of glasses composed primarily of the oxides of magnesium, aluminum, and silicon with a chemical composition that produces glass fibers having a higher mechanical strength than E-Glass fibers. The composition for forming S-Glass includes approximately 65 weight % $SiO_2$, 25 weight % $Al_2O_3$, and 10 weight % MgO. S-glass has a composition that was originally designed to be used in high-strength applications such as ballistic armor.

R-Glass is a family of glasses that are composed primarily of the oxides of silicon, aluminum, magnesium, and calcium with a chemical composition that produces glass fibers with a higher mechanical strength than E-Glass fibers. R-Glass has a composition that contains about 58 to about 60 weight % $SiO_2$, about 23.5 to about 25.5 weight % $Al_2O_3$, about 14 to about 17 weight % CaO plus MgO, 0% $B_2O_3$, 0% $F_2$ and less than about 2 weight % of miscellaneous components. R-Glass contains more alumina and silica than E-Glass and requires higher melting and processing temperatures during fiber forming. Typically, the melting and processing temperatures for R-Glass are at least about 160° C. higher than those for E-Glass. This increase in processing temperature requires the use of a high-cost platinum-lined melter. In addition, the close proximity of the liquidus temperature to the forming temperature in R-Glass requires that the glass be fiberized at a viscosity lower than E-Glass, which is customarily fiberized at or near about 1000 poise. Fiberizing R-Glass at the customary 1000 poise viscosity would likely result in glass devitrification, which causes process interruptions and reduced productivity.

Tables IA-IE set forth the compositions for a number of conventional high-strength glass compositions.

TABLE I-A

| Constituent | Chinese High Strength glass | RUSSIAN CONTINUOUS ROVING MAGNESIUM ALUMINO-SILICATE | NITTOBO "T" Glass Fabric "B" | NITTOBO "T" Glass Fabric (Yarn) "C" |
|---|---|---|---|---|
| $SiO_2$ | 55.08 | 55.81 | 64.58 | 64.64 |
| CaO | 0.33 | 0.38 | 0.44 | 0.40 |
| $Al_2O_3$ | 25.22 | 23.78 | 24.44 | 24.57 |
| $B_2O_3$ | 1.85 | | 0.03 | 0.03 |
| MgO | 15.96 | 15.08 | 9.95 | 9.92 |
| $Na_2O$ | 0.12 | 0.063 | 0.08 | 0.09 |
| Fluorine | 0.03 | | 0.034 | 0.037 |
| $TiO_2$ | 0.023 | 2.33 | 0.019 | 0.018 |
| $Fe_2O_3$ | 1.1 | 0.388 | 0.187 | 0.180 |
| $K_2O$ | 0.039 | 0.56 | 0.007 | 0.010 |
| $ZrO_2$ | 0.007 | 0.15 | | |
| $Cr_2O_3$ | | 0.011 | 0.003 | 0.003 |
| $Li_2O$ | | 1.63 | | |
| $CeO_2$ | | | | |

TABLE I-B

| Constituent | Nitto Boseki A&P Yarn | Nitto Boseki NT6030 Yarn | Nitto Boseki TE Glass RST-220PA-535CS | Vetrotex Saint Gobain SR Glass Stratifils SR CG 250 P109 | Polotsk STEKLOVOLOKNO High Strength Glass |
|---|---|---|---|---|---|
| $SiO_2$ | 65.51 | 64.60 | 64.20 | 63.90 | 58.64 |
| CaO | 0.44 | 0.58 | 0.63 | 0.26 | 0.61 |
| $Al_2O_3$ | 24.06 | 24.60 | 25.10 | 24.40 | 25.41 |
| $B_2O_3$ | | | | | 0.04 |
| MgO | 9.73 | 9.90 | 9.90 | 10.00 | 14.18 |
| $Na_2O$ | 0.04 | 0.06 | 0.020 | 0.039 | 0.05 |
| Fluorine | 0.07 | | | | 0.02 |
| $TiO_2$ | 0.016 | 0.000 | 0.000 | 0.210 | 0.624 |
| $Fe_2O_3$ | 0.067 | 0.079 | 0.083 | 0.520 | 0.253 |
| $K_2O$ | 0.020 | 0.020 | 0.020 | 0.540 | 0.35 |
| $ZrO_2$ | 0.079 | | | | |
| $Cr_2O_3$ | 0.0010 | | | 0.001 | 0.023 |
| $Li_2O$ | | | | | |
| $CeO_2$ | | | | | |

TABLE I-C

| Constituent | Chinese High Strength Yarn (8 micron) | Chinese High Strength Glass Roving | Zentron S-2 Glass Roving | SOLAIS Glass Sample | Advanced Glass Yarns R Glass |
|---|---|---|---|---|---|
| $SiO_2$ | 55.22 | 55.49 | 64.74 | 64.81 | 58.46 |
| CaO | 0.73 | 0.29 | 0.14 | 0.55 | 9.39 |
| $Al_2O_3$ | 24.42 | 24.88 | 24.70 | 24.51 | 24.55 |
| $B_2O_3$ | 3.46 | 3.52 | | 0.02 | 0.04 |
| MgO | 12.46 | 12.28 | 10.24 | 9.35 | 5.91 |
| $Na_2O$ | 0.104 | 0.06 | 0.17 | 0.16 | 0.079 |
| Fluorine | 0.07 | | | 0.02 | 0.054 |
| $TiO_2$ | 0.32 | 0.36 | 0.015 | 0.04 | 0.196 |
| $Fe_2O_3$ | 0.980 | 0.930 | 0.045 | 0.238 | 0.400 |
| $K_2O$ | 0.240 | 0.150 | 0.005 | 0.03 | 0.67 |
| $ZrO_2$ | | | | | |
| $Cr_2O_3$ | 0.0050 | | | 0.007 | 0.005 |
| $Li_2O$ | 0.59 | 0.63 | | | |
| $CeO_2$ | 1.23 | 1.25 | | | |

TABLE I-D

| Constituent | Advanced Glass Yarns S Glass | Culimeta Roving | IVG Vertex B96 675 Yarn | IVG Vertex Glass Roving | IVG Vertex Outside #1 Glass Roving |
|---|---|---|---|---|---|
| $SiO_2$ | 64.61 | 59.37 | 58.34 | 58.58 | 58.12 |
| CaO | 0.17 | 0.27 | 0.31 | 0.30 | 0.31 |
| $Al_2O_3$ | 24.84 | 25.49 | 23.81 | 24.26 | 24.09 |
| $B_2O_3$ | 0.04 | 0.05 | | | |
| MgO | 10.11 | 13.47 | 14.99 | 15.02 | 15.36 |
| $Na_2O$ | 0.118 | 0.024 | 0.05 | 0.02 | 0.03 |
| Fluorine | 0.03 | | 0.04 | 0.04 | 0.04 |
| $TiO_2$ | 0.011 | 0.530 | 1.380 | 0.67 | 0.91 |
| $Fe_2O_3$ | 0.042 | 0.374 | 0.333 | 0.336 | 0.303 |
| $K_2O$ | | 0.48 | 0.42 | 0.28 | 0.29 |
| $ZrO_2$ | | 0.152 | 0.129 | 0.165 | 0.157 |
| $Cr_2O_3$ | 0.0050 | 0.0120 | 0.0100 | 0.0120 | 0.0120 |
| $Li_2O$ | | | | | |
| $CeO_2$ | | | | | |

TABLE I-E

| Constituent | IVG Vertex Outside #2 Glass Roving | RH CG250 P109 Glass Fiber Strand |
|---|---|---|
| $SiO_2$ | 58.69 | 58.54 |
| CaO | 0.29 | 9.35 |
| $Al_2O_3$ | 24.3 | 25.39 |
| $B_2O_3$ | | |
| MgO | 15.06 | 6.15 |
| $Na_2O$ | 0.03 | 0.10 |
| Fluorine | 0.04 | 0.16 |
| $TiO_2$ | 0.64 | 0.008 |
| $Fe_2O_3$ | 0.331 | 0.069 |
| $K_2O$ | 0.36 | 0.14 |
| $ZrO_2$ | 0.187 | 0.006 |
| $Cr_2O_3$ | 0.0130 | |
| $Li_2O$ | | |
| $CeO_2$ | | |

R-Glass and S-Glass are produced by melting the constituents of the compositions in a platinum-lined melting container. The costs of forming R-Glass and S-Glass fibers are dramatically higher than E-Glass fibers due to the cost of producing the fibers in such melters. Thus, there is a need in the art for glass compositions useful in the formation of high performance glass fibers from a direct-melt process in a refractory-lined furnace and fibers formed from such compositions.

SUMMARY OF THE INVENTION

The invention, in part, is a glass composition for the formation of continuous glass fibers that are suitable for use in high-strength applications. The composition of the present invention may be inexpensively formed into glass fibers using low-cost, direct melting in refractory-lined furnaces due to the relatively low fiberizing temperature of the glass fibers. Once formed into fibers, the glass composition provides the strength characteristics of higher-priced glass fibers such as S-Glass. The composition of the present invention includes about 60.5 to about 70.5 weight % $SiO_2$, about 10.0 to about 24.5 weight % $Al_2O_3$, about 6.0 to about 20.0 weight % RO, where RO equals the sum of MgO, CaO, SrO and BaO, and about 0.0 to about 3.0 weight % alkali metal oxides. In a preferred embodiment, the glass composition is composed of about 61 to about 68 weight % $SiO_2$, about 15 to about 19 weight % $Al_2O_3$, about 15 to about 20 weight % RO, where RO equals the sum of MgO, CaO, SrO and BaO, and about 0 to about 3 weight % alkali metal oxides. The composition preferably does not contain more than about 4 weight % of oxides or halogens selected from the group consisting of ZnO, $SO_3$, Fluorine, $B_2O_3$, $TiO_2$, $ZrO_2$ and $Fe_2O_3$. The desired properties of the glass composition of the present invention include a fiberizing temperature of less than about 2650° F. and a liquidus temperature that is preferably below the fiberizing temperature by at least about 80° F., more preferably by at least about 120° F., and most preferably by at least about 150° F.

DETAILED DESCRIPTION AND PREFERRED EMBODIMENTS OF THE INVENTION

Fiberizing properties of the glass composition of the present invention include the fiberizing temperature, the liquidus, and delta-T. The fiberizing temperature is defined as the temperature that corresponds to a viscosity of about 1000 Poise. As discussed in more detail below, a lowered fiberizing temperature reduces the production cost of the fibers, allows for a longer bushing life, increases throughput, permits the glass to be melted in a refractory-lined melter, and reduces energy usage. For example, at a lower fiberizing temperature, a bushing operates at a cooler temperature and does not "sag" as quickly. Sag is a phenomenon that occurs in bushings that are held at an elevated temperature for extended periods of time. By lowering the fiberizing temperature, the sag rate of the bushing may be reduced and the bushing life can be increased. In addition, a lower fiberizing temperature allows for a higher throughput since more glass can be melted in a given period at a given energy input. As a result, production cost is reduced. In addition, a lower fiberizing temperature will also permit glass formed with the inventive composition to be melted in a refractory-lined melter since both its melting and fiberizing temperatures are below the upper use temperatures of many commercially available refractories.

The liquidus is defined as the highest temperature at which equilibrium exists between liquid glass and its primary crystalline phase. At all temperatures above the liquidus, the glass is free from crystals in its primary phase. At temperatures below the liquidus, crystals may form.

Another fiberizing property is delta-T ($\Delta T$), which is defined as the difference between the fiberizing temperature and the liquidus. A larger $\Delta T$ offers a greater degree of flexibility during the formation of the glass fibers and helps to inhibit devitrification of the glass (that is, the formation of crystals within the melt) during melting and fiberizing. Increasing the $\Delta T$ also reduces the production cost of the glass fibers by allowing for a greater bushing life and by providing a wider process window for forming fibers.

The glasses of the present invention are suitable for melting in traditional commercially available refractory-lined glass melters, which are widely used in the manufacture of glass reinforcement fibers. Starting batch components typically include $SiO_2$ (ground silica sand), and $Al_2O_3$ (calcined alumina), as well as chain modifiers from source materials such as $MgCO_3$ (magnesite), $CaCO_3$ (limestone), $SrCO_3$ (strontianite), $BaCO_3$ (witherite), $ZrSiO_4$ (zircon), and $Na_2CO_3$ (natrite).

The glass batch is preferably composed of about 60.5 to about 70.5 weight percent $SiO_2$, about 10.0 to about 24.5 weight percent $Al_2O_3$, about 6.0 to about 20.0 weight percent RO, where RO equals the sum of MgO, CaO, and SrO, and about 0.0 to about 3.0 weight percent alkali metal oxides. A fiber formed in accordance with the present invention will typically include small amounts of ZnO, $SO_3$, Fluorine, $B_2O_3$, $TiO_2$ and $Fe_2O_3$, preferably in an amount of less than 4 weight percent. In addition, a fiber formed in accordance with the present invention will preferably having a fiberizing temperature of less than about 2650° F., a $\Delta T$ of at least about 80° F., preferably a $\Delta T$ of at least about 120° F., and most preferably a $\Delta T$ of at least 150° F., and a coefficient of thermal expansion (CTE) of about $2.28 \times 10^{-6}$ in/in/° F. to about $2.77 \times 10^{-6}$ in/in/° F. Further, the glass of the present invention preferably have a strength in excess of 600 KPSI, preferably a strength in excess of about 630 KPSI, and most preferably a strength in excess of about 695 KPSI. Further, the glass fibers will desirably have a modulus greater than about 12.0 MPSI, preferably greater then about 12.18 MPSI, and most preferably greater then about 12.6 MPSI. It will be appreciated that certain details of construction are not provided in view of such details being conventional and well within the skill of the art.

The present invention also includes a composite material including glass fibers, as described above, in combination with a hardenable matrix material. The composite material is especially useful in applications where high strength and stiffness and low weight are desired. Such applications include aircraft, automotive, and wind energy (such as windmill blades) as well as any other application where low weight, stiffness and high strength are desired. Suitable hardenable matrix materials include thermoset and thermoplastic resins. By way of example, suitable thermoset matrix materials include vinyl esters, polyesters, resin epoxies and combinations or copolymers thereof. Typically, windmill blades are formed by any suitable composite fabrication technique, such as vacuum-assisted resin infusion or pre-impregnated reinforcement lay-up.

Having generally described this invention, a further understanding can be obtained by reference to certain specific examples illustrated below which are provided for purposes of illustration only and are not intended to be all inclusive or limiting unless otherwise specified.

EXAMPLES

The glasses in the examples listed in Tables IIA-IIC were melted in platinum crucibles or in a continuous platinum-lined melter for determining the mechanical and physical properties of the glass and fibers produced therefrom. The units of measurement for the physical properties are: Viscosity (° F.), Liquidus temperature (° F.) and $\Delta T$ (° F.). In some examples the glasses were fiberized and Strength (KPsi), Density (g/cc), Modulus (MPsi), Softening Point (° F.) and coefficient of thermal expansion (CTE) (in/in/(° F.)) were measured.

The fiberizing temperature was measured using a rotating spindle viscometer. The fiberizing viscosity is defined as 1000 Poise. The liquidus was measured by placing a platinum container filled with glass in a thermal gradient furnace for 16 hours. The greatest temperature at which crystals were present was considered the liquidus temperature. The modulus was measured using the sonic technique on a single fiber of glass. The tensile strength was measured on a pristine single fiber. The CTE was measured with a dilatometer over the range of temperature from 25 to 600 degrees C. The softening point temperature was measured using the ASTM C338 fiber-elongation method.

TABLE IIA

| | Glass | | | | | |
|---|---|---|---|---|---|---|
| | Ex. 1 | Ex. 2 | Ex. 3 | Ex. 4 | Ex. 5 | Ex. 6 |
| $SiO_2$ | 62.63 | 62.42 | 61.75 | 63.01 | 63.07 | 63.16 |
| CaO | 8.49 | 8.64 | 8.57 | 4.84 | 4.85 | 4.8 |
| $Al_2O_3$ | 18.50 | 18.54 | 18.82 | 19.99 | 20.03 | 19.76 |
| MgO | 9.47 | 9.64 | 9.65 | 11.26 | 11.28 | 11.33 |
| $Na_2O$ | 0.70 | 0.69 | | 0.70 | 0.70 | |
| $TiO_2$ | 0.00 | 0.01 | 0.01 | 0.00 | 0.01 | 0.02 |
| $Fe_2O_3$ | 0.20 | 0.05 | 0.045 | 0.20 | 0.05 | 0.037 |
| Measured Viscosity (° F.) | 2491 | na | na | 2514 | na | na |
| Measured Liquidus (° F.) | 2261 | 2247 | na | 2335 | na | na |
| Measured DT (° F.) | 230 | na | na | 179 | na | na |
| Measured Strength (KPsi) | 672 | na | na | 695 | na | na |
| Measured Density (g/cc) | 2.556 | na | na | 2.530 | na | na |
| Measured Modulus (MPsi) | 12.4 | 12.6 | na | 12.6 | 12.7 | na |
| Softening Point (° F.) | na | na | na | 1765 | na | na |
| CTE in/in/(° F.) | na | na | na | $2.28 \times 10^{-6}$ | na | na |

TABLE II-B

| | Glass | | | | | |
|---|---|---|---|---|---|---|
| | Ex. 7 | Ex. 8 | Ex. 9 | Ex. 10 | Ex. 11 | Ex. 12 |
| $SiO_2$ | 62.32 | 63.89 | 63.14 | 61.39 | 61.39 | 65.00 |
| CaO | 11.56 | 11.21 | 11.96 | 11.96 | 8.71 | 13.00 |
| $Al_2O_3$ | 17.25 | 16.39 | 16.39 | 18.14 | 18.89 | 15.00 |
| MgO | 7.98 | 6.62 | 6.62 | 6.62 | 9.62 | 5.00 |
| $Na_2O$ | 0.70 | 0.75 | 0.75 | 0.75 | 0.25 | 1.00 |
| $TiO_2$ | 0.00 | 0.75 | 0.75 | 0.75 | 0.75 | 1.00 |
| $Fe_2O_3$ | 0.20 | 0.39 | 0.39 | 0.39 | 0.39 | |
| Measured Viscosity (° F.) | 2458 | 2493 | 2435 | 2431 | 2434 | 2509 |
| Measured Liquidus (° F.) | 2301 | 2268 | 2294 | 2353 | 2261 | 2226 |
| Measured DT (° F.) | 157 | 225 | 141 | 78 | 173 | 283 |
| Measured Strength (KPsi) | 632 | 636 | 622 | 615 | 682 | 612 |
| Measured Density (g/cc) | 2.573 | 2.553 | 2.567 | 2.567 | 2.564 | na |
| Measured Modulus (MPsi) | 12.2 | 12.2 | 12.2 | 12.2 | 12.6 | na |
| Softening Point (° F.) | 1729 | na | na | na | na | na |
| CTE in/in/(° F.) | $2.77 \times 10^{-6}$ | na | na | na | na | na |

TABLE II-C

| | Glass | | | | | |
|---|---|---|---|---|---|---|
| | Ex. 13 | Ex. 14 | Ex. 15 | Ex. 16 | Ex. 17 | Ex. 18 |
| $SiO_2$ | 63.89 | 65.00 | 64.00 | 63.89 | 65.00 | 65.00 |
| CaO | 6.96 | 14.00 | 4.00 | 8.96 | 14.00 | 12.50 |
| $Al_2O_3$ | 18.64 | 15.00 | 20.00 | 18.89 | 15.00 | 15.00 |
| MgO | 9.62 | 6.00 | 11.00 | 6.62 | 5.00 | 5.00 |
| $Na_2O$ | 0.25 | 0.00 | 1.00 | 0.75 | 0.00 | 1.00 |
| $TiO_2$ | 0.25 | 0.00 | 0.00 | 0.75 | 1.00 | 1.00 |
| $Fe_2O_3$ | 0.39 | 0.00 | 0.00 | 0.14 | 0.00 | 0.50 |
| Measured Viscosity (° F.) | 2513 | 2508 | 2548 | 2565 | 2481 | 2523 |
| Measured Liquidus (° F.) | 2337 | 2373 | 2401 | 2288 | 2403 | 2227 |

TABLE II-C-continued

|  | Glass | | | | | |
| --- | --- | --- | --- | --- | --- | --- |
|  | Ex. 13 | Ex. 14 | Ex. 15 | Ex. 16 | Ex. 17 | Ex. 18 |
| Measured DT (° F.) | 176 | 135 | 147 | 277 | 78 | 296 |
| Measured Strength (KPsi) | 695 | 624 | na | na | 604 | na |
| Measured Density (g/cc) | 2.480 | 2.554 | na | na | 2.546 | na |
| Measured Modulus (MPsi) | 12.3 | 12.0 | na | na | 11.9 | na |
| Softening Point (° F.) | na | na | na | na | na | na |
| CTE in/in/(° F.) | na | na | na | na | na | na |

As is understood in the art, the above exemplary inventive compositions do not always total 100% of the listed components due to statistical conventions (such as, rounding and averaging) and the fact that some compositions may include impurities that are not listed. Of course, the actual amounts of all components, including any impurities, in a composition always total 100%. Furthermore, it should be understood that where small quantities of components are specified in the compositions, for example, quantities on the order of about 0.05 weight percent or less, those components may be present in the form of trace impurities present in the raw materials, rather than intentionally added.

Additionally, components may be added to the batch composition, for example, to facilitate processing, that are later eliminated, thereby forming a glass composition that is essentially free of such components. Thus, for instance, minute quantities of components such as fluorine and sulfate may be present as trace impurities in the raw materials providing the silica, calcia, alumina, and magnesia components in commercial practice of the invention or they may be processing aids that are essentially removed during manufacture.

As apparent from the above examples, glass fiber compositions of the invention have advantageous properties, such as low fiberizing temperatures and wide differences between the liquidus temperatures and the fiberizing temperatures (high ΔT values). Other advantages and obvious modifications of the invention will be apparent to the artisan from the above description and further through practice of the invention). The high-performance glass of the present invention melts and refines at relatively low temperatures, has a workable viscosity over a wide range of relatively low temperatures, and a low liquidus temperature range.

The invention of this application has been described above both generically and with regard to specific embodiments. Although the invention has been set forth in what is believed to be the preferred embodiments, a wide variety of alternatives known to those of skill in the art can be selected within the generic disclosure. Other advantages and obvious modifications of the invention will be apparent to the artisan from the above description and further through practice of the invention. The invention is not otherwise limited, except for the recitation of the claims set forth below.

We claim:

1. A glass fiber formed from a batch composition, comprising:
   about 60.5 to about 70.5 weight percent $SiO_2$;
   about 10 to about 24.5 weight percent $Al_2O_3$;
   about 15 to about 20 weight percent alkaline earth oxide, 5 to 11.33 weight percent of said alkaline earth oxide being MgO;
   about 0 to about 3 weight percent $ZrO_2$; and
   about 0 to about 3 weight percent alkali metal oxide.

2. The glass fiber of claim 1, wherein said glass has a fiberizing temperature of less than about 2650° F., and a ΔT at least about 80° F.

3. The glass fiber of claim 2 wherein the ΔT for the glass is at least about 120° F.

4. The glass fiber of claim 2 wherein the ΔT for the glass is at least about 150° F.

5. The glass fiber of claim 1, wherein said fiber has a coefficient of thermal expansion (CTE) of between about $2.28 \times 10^{-6}$ in/in/° F. and about $2.77 \times 10^{-6}$ in/in/° F.

6. The glass fiber of claim 1, wherein said fiber has a strength in excess of about 600 KPSI.

7. The glass fiber of claim 1, wherein said fiber has a strength in excess of about 630 KPSI.

8. The glass fiber of claim 1, wherein said fiber has a strength in excess of about 695 KPSI.

9. The glass fiber of claim 1, wherein said fiber has a modulus in excess of about 12.0 MPSI.

10. The glass fiber of claim 1, wherein said fiber has a modulus in excess of about 12.2 MPSI.

11. The glass fiber of claim 1, wherein said fiber has a modulus in excess of about 12.6 MPSI.

12. The glass fiber of claim 1, further comprising:
    less than 4 weight percent of compounds selected from the group consisting of ZnO, $SO_3$, Fluorine, $B_2O_3$, $TiO_2$ and $Fe_2O_3$.

13. The glass fiber of claim 1, wherein the glass produced from said batch has a softening point of about 1765° F.

14. A fiberglass reinforced article comprising:
    glass fibers comprising:
        about 60.5 to about 70.5 weight percent $SiO_2$;
        about 10 to about 24.5 weight percent $Al_2O_3$;
        about 15 to about 20 weight percent alkaline earth oxide, 5 to 11.33 weight percent of said alkaline earth oxide being MgO;

about 0 to about 3 weight percent alkali metal oxides; and about 0 to about 3 weight percent $ZrO_2$; and a curable matrix material.

15. The fiberglass reinforced article of claim 14, wherein said reinforced article is a blade for a wind turbine.

16. The fiberglass reinforced article of claim 14, wherein said curable matrix material is selected from the group consisting of vinyl ester; polyester; resin epoxy and combinations or copolymers thereof.

* * * * *